United States Patent
Zanoni et al.

[11] Patent Number: 5,991,070
[45] Date of Patent: Nov. 23, 1999

[54] OPTICAL AMPLIFIER WITH OSCILLATING PUMP ENERGY

[75] Inventors: Raymond Zanoni; Robert Waarts, both of Fremont, Calif.

[73] Assignee: SDL, Inc., San Jose, Calif.

[21] Appl. No.: 08/970,493

[22] Filed: Nov. 14, 1997

[51] Int. Cl.[6] ............................ H01S 3/091; H01S 3/094; G02B 6/26
[52] U.S. Cl. ......................... 359/341; 359/160; 359/342; 359/345; 372/72
[58] Field of Search .................................... 359/134, 160, 359/341, 342, 345; 372/6, 72

[56] References Cited

U.S. PATENT DOCUMENTS

| | | | |
|---|---|---|---|
| 4,173,001 | 10/1979 | Frosch | 359/337 |
| 5,050,183 | 9/1991 | Duling, III | 372/94 |
| 5,140,456 | 8/1992 | Huber | 359/341 |
| 5,263,036 | 11/1993 | De Bernardi et al. | 372/6 |
| 5,473,622 | 12/1995 | Grubb | 372/6 |
| 5,497,265 | 3/1996 | Fontana et al. | 359/341 |
| 5,506,723 | 4/1996 | Junginger | 359/341 |
| 5,563,733 | 10/1996 | Mitsuda et al. | 359/341 |
| 5,621,749 | 4/1997 | Boney | 372/6 |
| 5,677,920 | 10/1997 | Waarts et al. | 372/6 |

OTHER PUBLICATIONS

O plus B, #113, pp. 75–82, 1989.

Primary Examiner—Nelson Moskowitz
Attorney, Agent, or Firm—Kudirka & Jobse, LLP

[57] ABSTRACT

An optical amplifier uses a gain medium pumped with pump energy of a first wavelength that oscillates through the gain medium. In one embodiment, the pumping is essentially a cavity resonator that is coupled to either end of the gain medium such that oscillating pump energy passes through the gain medium as it reflects back and forth between the ends of the cavity. Highly reflective gratings may be used to maintain the oscillation of the pump energy, and a pump energy source, such as pumped doped optical fiber, is coupled to at least one of the gratings. In another embodiment, the pump source consists of multiple reflectors used at each end, and independent pump sources each having a slightly different wavelength within the absorption spectrum of the amplifier are coupled together, such that two pump wavelengths are simultaneously oscillated through the gain medium. In yet another embodiment of the invention, the reflective gratings are integrated directly into a portion of the pathway through which the signal to be amplified passes. This embodiment uses a pump source that causes generation of the pump energy in the gain medium which, in turn, provides amplification of the optical signal. A two-pass embodiment is also shown in which the optical signal enters and exits from the same end of the amplifier gain medium. An optical circulator may be used to provide unidirectional porting of the input and output signals to the gain medium.

22 Claims, 3 Drawing Sheets

OPTICAL AMPLIFIER WITH OSCILLATING PUMP ENERGY

FIELD OF THE INVENTION

This invention relates to the field of optical amplifiers and, more particularly, to means of applying pump energy to an optical amplifier.

BACKGROUND OF THE INVENTION

As is known in the art, an optical amplifier is a device that increases the amplitude of an input optical signal fed thereto. If the optical signal at the input to such an amplifier is monochromatic, the output will also be monochromatic, with the same frequency. A conventional optical amplifier comprises a gain medium, such as a single mode glass fiber having a core doped with a rare earth material, connected to a WDM coupler which provides low insertion loss at both the input signal and pump wavelengths. The input signal is provided, via the coupler, to the medium. Excitation occurs through optical pumping from the pumping source. Pump energy that is within the absorption band of the rare earth dopant is combined with the optical input signal within the coupler, and applied to the medium. The pump energy is absorbed by the gain medium, and the input signal is amplified by stimulated emission from the gain medium.

Such amplifiers are typically used in a variety of applications including, but not limited to, amplification of weak optical pulses such as those that have traveled through a long length of optical fiber in communication systems. Optical amplification can take place in a variety of materials including those materials, such as silica, from which optical fibers are formed. Thus, a signal propagating on a silica-based optical fiber can be introduced to a silica-based optical fiber amplifier, and amplified by coupling pump energy into the amplifier gain medium.

Fiber amplifiers are generally constructed by adding impurities to (i.e. "doping") an optical fiber. For a silica-based fiber, such dopants include the elements erbium and ytterbium. For example, one type of fiber amplifier referred to as an erbium (Er) amplifier typically includes a silica fiber having a single-mode core doped with erbium ions (conventionally denoted as $Er^{3+}$). It is well known that an erbium optical fiber amplifier operating in its standard so-called three level mode is capable, when pumped at a wavelength of 980 nanometers (nm), of amplifying optical signals having a wavelength of approximately 1550 nanometers (nm). Likewise, an amplifier having a silica-based fiber "co-doped" with erbium and ytterbium shows excellent amplification of a 1550 nm optical signal when pumped with a wavelength from about 980 nm to about 1100 nm. A particularly useful pump wavelength is 1060 nm because of the availability of high power solid state laser sources at about 1060 nm. Since 1550 nm is approximately the lowest loss wavelength of conventional single-mode glass fibers, these amplifiers are well-suited for inclusion in fiber systems that propagate optical signals in the wavelength vicinity of 1550 nm.

It has been an ongoing pursuit in the field of optical fiber amplifiers to increase the power output of the amplifiers. Higher power levels permit transmission over longer distances before further amplification is necessary. In addition, newer wavelength division multiplexed systems have a relatively low power-per-channel, given a constant total output power. This increases the need for higher total amplifier output power. Traditionally, pump energy is applied to the gain medium by coupling it into the doped fiber either in the same propagation direction as the signal to be amplified (referred to as "co-pumping"), or by coupling it into the doped fiber in the opposite direction as the signal to be amplified (referred to as "counter-pumping). Each of these pumping methods has its own advantages, but also its own limitations. It is an object of this invention to go beyond these traditional pumping methods to provide a high power optical amplifier that uses a new means of optical pumping.

SUMMARY OF THE INVENTION

In accordance with the present invention, an optical amplifier is provided in which an optical gain medium is pumped by pump energy that is oscillated through a substantial portion of the gain medium. That is, a resonant cavity for the pump energy is formed that includes the amplifier gain medium, such that the pump energy is reflected back and forth through the gain medium. The output coupling for the resonant cavity is absorption by the gain medium, which results in amplification of the optical signal by stimulated emission as it passes through the gain medium.

In a preferred embodiment, the gain medium is an optical fiber doped with a rare earth element. The optical pumping apparatus used to generate the oscillating pump energy may take a number of different forms. In general, reflectors that reflect optical energy at the pump wavelength are coupled to either side of the gain medium, and reflect the pump energy back and forth through the gain medium. In one embodiment, each reflector is located in its own optical pathway separate from the gain medium, a first of these pathways being coupled to a first side of the gain medium while the second is coupled to the second side of the gain medium. The coupling is preferably by wavelength division multiplexers (WDMs), so that only the pump energy is diverted from the signal path and directed to the reflectors. In one variation of this embodiment, each reflector is coupled to a pump energy generator, preferably in the form of a pumped optical fiber, so that pump energy is generated on either side of a doped optical fiber gain medium. In another variation, the pump energy is generated at only one side of the gain medium, while the other side has only a reflector. In either case, the pump energy is oscillated in the pathway between the reflectors, providing the desired oscillation of pump energy through the gain medium.

When the pump energy is coupled into the gain medium using wavelength selective couplers, another variation of the invention involves using a plurality of pump wavelengths, each of which is within the absorption band of the gain medium. In such an embodiment, a plurality of reflectors may be used in each of the two pump energy pathways located, respectively, to either side of the gain medium. The different pump wavelengths are preferably close in wavelength, and each set of reflectors (i.e. each group of reflectors located to one optical side of the gain medium) may be coupled together using narrowband wavelength selective couplers, such as narrowband WDMs for a doped optical fiber gain medium. Furthermore, some or all of the reflectors may be coupled to pump sources that generate optical energy at the desired pump wavelengths. In general, the amount of pump energy at each wavelength generated at each end of the amplifier may be varied to optimize amplifier efficiency and noise figure.

In each of the above embodiments, an optical fiber gain medium may be doped with erbium/ytterbium (Er/Yb), which provides amplification of a 1550 nm optical signal when the fiber is pumped at a wavelength of 1064 nm. The highly reflective gratings of the amplifier may then be selected to reflect the 1064 nm wavelength, and the pump sources may themselves be doped single-mode or double-clad optical fibers. For example, the fiber may be doped with ytterbium (Yb), and pumped with optical energy at a wavelength of, for example, 915 nm or 980 nm. Another example might be a Neodymium doped fiber pumped at a wavelength of 808 nm, or even a combination of dopants and pumping wavelengths.

In another embodiment of the invention, the reflectors for providing oscillation of the pump energy through the gain medium are integrated into a portion of the signal pathway and, for a doped optical fiber gain medium, may be integrated into the amplifier fiber itself. These reflectors, preferably highly reflective Bragg gratings, are wavelength specific, and do not significantly interfere with the optical signal to be amplified. That is, the reflectors maintain oscillation of optical energy at the pumping wavelength through the gain medium, while the optical signal passes through them and through the doped optical fiber. To cause generation of energy at the pump wavelength, a pump source is coupled into the gain medium which results in amplification of optical energy at the pump wavelength within the gain medium. Thus, the output of the pump source is absorbed by the doped optical fiber, and amplifies pump energy that oscillates between the two reflectors. The oscillating pump energy, in turn, is absorbed by the gain medium and amplifies the optical signal passing through the fiber. In such an embodiment, a ytterbium-doped fiber may be used. The signal wavelength could then be 1090 nm, the pump energy wavelength 1064 nm, and the pump source wavelength 915 nm. Another example might be the use of a 1300 nm signal wavelength that is amplified by pump energy at 1230 nm which, in turn, is generated when a pump source at 1165 nm is applied to the gain medium. Still another example could be a Raman amplifier that uses a pump source at 1390 nm to provide Raman gain at 1480 nm, which would then act as the pump energy wavelength to provide gain at a signal wavelength of 1550 nm.

In one variation of the embodiment having reflectors integrated into the signal pathway, the amplifier is a two-pass amplifier. A signal reflector is provided at one end of the gain medium and reflects optical energy at the wavelength of the optical signal. The optical signal is then coupled through an input port into the other end of the gain medium. The optical signal is amplified as it passes through the gain medium, which is pumped by oscillating pump energy. Upon reaching the end of the gain medium, the optical signal encounters the signal reflector, and is directed back through the gain medium, where it is further amplified. At the end of the gain medium where it initially entered, the amplified optical signal is coupled out through an output port.

The foregoing embodiment may be accomplished by using an optical circulator, which allows unidirectional coupling of an optical signal from one port of the circulator to another. If the optical signal is input to a first port of the circulator, the amplifier may be located in a branch coupled to a second port, which receives the optical signal from the first port. The amplified optical signal, after passing twice through the gain medium, returns to the second port of the circulator, where it is coupled to a third port. In one version of this embodiment, the third port is simply a system output port. However, a second amplifier, identical to that connected to the second port, may be located in a branch coupled to the third port, and a fourth port of the circulator could then serve as the system output port. Additional amplifier branches can also be added in a similar manner up to the maximum port capacity of the circulator.

DETAILED DESCRIPTION OF THE PREFERRED EMBODIMENTS

Figure 1:
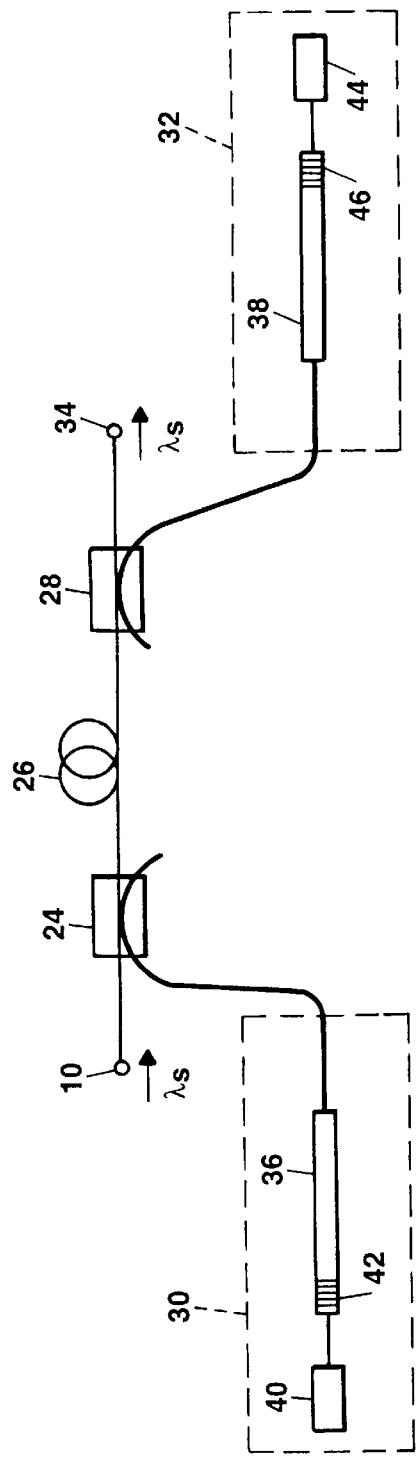
FIG. 1 is a schematic view of an optical amplifier according to a first embodiment of the present invention that couples pump sources into either side of a gain medium to oscillate pump energy across the gain medium.

Depicted in FIG. 1 is a doped fiber based optical amplifier having an optical pumping arrangement that uses two pump sources 30, 32 together to provide oscillation of the pump signal. In the preferred embodiment, an optical signal entering the amplifier via input port 10 has a wavelength $\lambda_s$ in the wavelength range of 1550 nm, and is therefore in the peak transmission range of conventional silica-based optical fiber. From port 10, the input signal is directed to wavelength division multiplexer (WDM) 24, by which it is coupled into doped optical fiber 26. The signal is amplified in the fiber 26, and is coupled out of the fiber gain medium by WDM 28 and directed to output port 34, where the amplified signal may be used in any desired application.

The optical fiber 26 is doped with a rare earth element, and is the heart of the fiber amplifier. In the preferred embodiment, the fiber is doped with erbium/ytterbium (Er/Yb) to create the desired gain medium. Given an Er/Yb doping, the optical fiber 26 may then be pumped with optical pump energy in the wavelength range of 1064 nm by the combination of pump sources 30 and 32, which are coupled into the fiber 26 via 1064/1550 WDMs 24 and 28, respectively. Pumping at this wavelength results in absorption of the pump energy by the doped fiber, and a corresponding amplification of the optical signal within the amplifier gain medium by stimulated emission at the signal wavelength. As discussed below, the arrangement of pump sources 30, 32 as shown provides pump energy that oscillates back and forth through the amplifier gain medium.

In the preferred embodiment, each of the pump sources 30, 32 is of identical construction. Pump source 30 consists of double-clad optical fiber 36, laser diode 40 and highly reflective Bragg grating 42. Pump source 32 consists of double-clad optical fiber 38, laser diode 44 and highly reflective Bragg grating 46. Each of the Bragg gratings 42, 46 is highly reflective to the pumping wavelength of 1064 nm. The fibers 36, 38 are each doped with ytterbium and each has optical energy input to it by its respective laser diode source 40, 44 at a wavelength in a high absorption wavelength range for a Yb-doped fiber. This results in a population inversion in each of the pump fibers 36, 38 which, in the resonant cavity arrangement of the two pump sources, results in the development of pump signal energy at the desired 1064 nm wavelength that oscillates between the gratings 42, 46. For example, generating pump energy at a wavelength of 915 nm with diodes 40, 44 and injecting it into the double-clad fibers is sufficient to cause the stimulated emission of optical radiation at 1064 nm. The gratings 42, 46 then reflect the 1064 nm pump energy back and forth between them, and through the optical fiber 26.

By establishing the pump energy reflection path through the optical fiber 26 itself, the pump energy at 1064 nm, necessary to continuously amplify the 1550 nm optical signal, can be replenished without the risk of destabilization that would exist if the outputs of two individual lasers were directed toward each other. For example, the direction of individual 1064 nm fiber lasers toward each other has been shown to destabilize both lasers, and cause both to lase at 1106 nm. In this embodiment, the two gratings 42, 46 combine to form the two ends between which the pump energy is reflected. The output coupler of the cavity is the absorption of pump energy by the fiber amplifier. Thus, by having the two sources 30, 32 act in concert, the risk of destabilization is removed.

In order to maximize the efficiency of the amplifier, the relationship between the absorption by the amplifier and the pumping by the sources 30, 32 may be exploited. The optimum output transmission for a laser cavity is given by:

$$T_{opt} = -L_i + \sqrt{(g_o L_i)}$$

where $T_{opt}$ is the optimum output transmission, $L_i$ is the internal cavity losses, and $g_0$ is the unsaturated gain of the laser cavity. Since the fiber amplifier can be considered to be the output coupler for the resonant cavity formed by the pump sources 30, 32, and since the transmission through the fiber amplifier is $T=e^{-\alpha l}$ (where R is the length of the fiber amplifier), the optimum length for optical fiber 26 is:

$$l_{opt} = (-1/\alpha)\log[-L_i + \sqrt{(g_o L_i)}].$$

Figure 2:
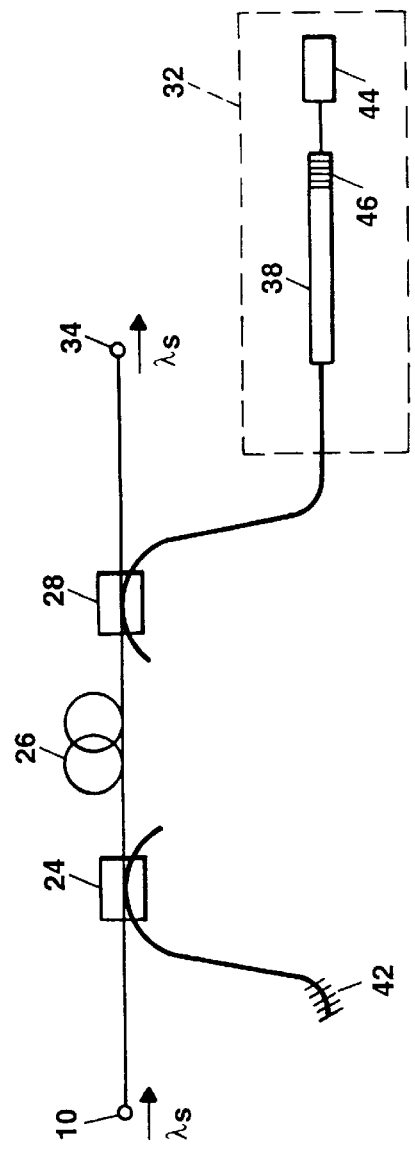
FIG. 2 is a schematic view of an optical amplifier according to a second embodiment of the present invention that couples a pump source into a first side of a gain medium, and reflects pump energy into an opposite side of the gain medium using a periodic grating that is highly reflective at the pump wavelength.

Shown in FIG. 2 is an alternative embodiment of the present invention. Unlike the embodiment of FIG. 1, which uses two pumped optical sources 30, 32 as the ends of the pump energy pathway, in FIG. 2, one of these sources is replaced with a periodic grating that is highly reflective at the pump energy wavelength. For example, grating 42 may be used to replace pump source 30. As in FIG. 1, the input signal enters port 10, is coupled into the gain medium of doped optical fiber 26 via WDM 24, and is coupled out of the gain medium via WDM 28 and directed toward output port 34. However, while the embodiment of FIG. 1 uses two individual pump sources 30, 32, the FIG. 2 embodiment uses only one. The high reflectivity of grating 42 at the desired wavelength of the pump energy (e.g., 1064 nm) allows it to function as one end of an oscillation path, while pump source 32 acts as the other end. The pump energy developed in the fiber 38 at 1064 nm is thus reflected back and forth between grating 46 and grating 42, passing through amplifier fiber 26 in the process and providing the desired pumping to the amplifier.

Figure 3:
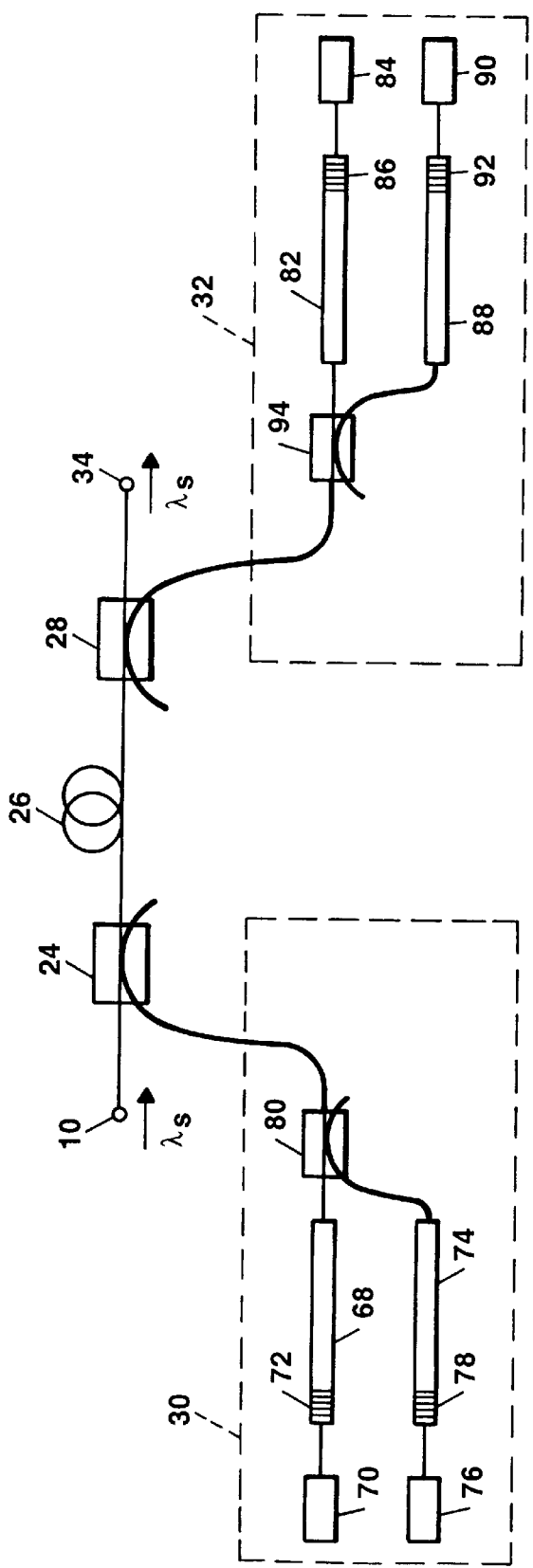
FIG. 3 is a schematic view of an alternative embodiment of the invention which is similar to the embodiment of FIG. 2, but which uses a plurality of coupled pump sources directed into each side of the amplifier gain medium.

Shown in FIG. 3 is another alternative embodiment of the present invention in which a plurality of fiber laser sources is used for each of the pump sources 30, 32. In the preferred version of this embodiment, each of the fiber lasers is similar to those used in the FIG. 1 embodiment, consisting of a double-clad fiber with a highly reflective Bragg grating and a laser diode pump. However, the fiber lasers for a given pump source 30, 32 each have different wavelengths, close to each other, in the range of 1064 nm. In pump source 30, double-clad fiber 68 is Yb-doped, and has a laser diode 70 as a source which provides pump energy in the range of, e.g., 915 nm. The grating 72 is selected to be highly reflective at a first wavelength in the 1064 nm range, such as 1060 nm. The double-clad fiber 74 and diode 76 can be identical to the fiber 68 and diode 70, respectively, except that Bragg grating 78 is highly reflective at a wavelength close to, but different from, the wavelength of grating 72. For example, grating 78 may be selected to be highly reflective at a wavelength of 1070 nm. The two different wavelengths (e.g., 1060 nm and 1070 nm) of pump source 30 are both in the wavelength absorption range of the Er/Yb doped amplifier fiber 26, and are therefore both adequate pump wavelengths for pumping the amplifier. These wavelengths are coupled together into the fiber 26 after being combined using narrowband WDM coupler 80, a 1060/1070 WDM.

In the preferred version of this embodiment, the construction of pump source 32 is identical to that of pump source 30. Yb-doped, double-clad optical fiber 82 is pumped by diode 84 at a wavelength of, e.g., 915 nm, and is stabilized by highly reflective grating 86 to an output wavelength of 1060 nm. Yb-doped, double-clad optical fiber 88 is pumped by diode 90 at a wavelength of, e.g., 915 nm, and is stabilized by highly reflective grating 92 to an output wavelength of 1070 nm. The 1060 nm and 1070 nm wavelengths of the two fiber lasers are combined by narrowband WDM 94, which is coupled to the opposite end of the amplifier fiber 26.

In the embodiment of FIG. 3, two overlapping oscillation paths are established, one for pump energy at 1060 nm and one for pump energy at 1070 nm. WDMs 80 and 94 allow these pump energies to be coupled for propagation through the optical fiber 26 of the amplifier, and segregated at the different fibers of each pump source 30, 32. It will be understood by those skilled in the art that, while the embodiment of FIG. 3 shows two fiber lasers per pump source, more than two fiber lasers per pump source could also be used. This would require the coupling of the additional pump energy wavelengths into the fiber amplifier using additional WDMs, but would function according to the same principles as the construction shown in FIG. 3.

Figure 4:
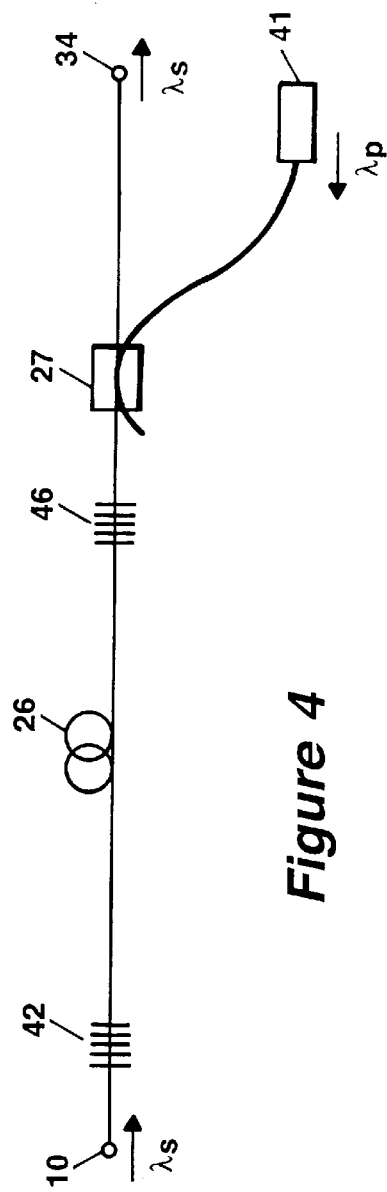
FIG. 4 is a schematic view of another alternative embodiment of the invention in which gratings that reflect the pump signal are integrated directly into the path of the signal to be amplified.

Shown in FIG. 4 is another alternative embodiment of the invention, in which the oscillating pump energy used to pump a fiber amplifier is achieved by integrating two pump gratings directly into an optical pathway through which the input optical signal passes. This pathway may or may not be part of the doped region of the amplifier fiber, but the embodiment removes the need for coupling the pump signals into the doped fiber, as is done using WDMs in the foregoing embodiments. As shown, one of the pump reflection gratings 42, 46 is positioned to either side of doped amplifier fiber 26. The gratings are highly reflective at the desired pumping wavelength, e.g., 1064 nm. Certain amplifier fibers (e.g., a double-clad, Yb-doped fiber), can serve as the gain medium for generating the pump energy at 1064 nm, and for amplifying a desired signal wavelength $\lambda_s$ such as 1090 nm.

In the embodiment of FIG. 4, initial pumping of the fiber 26 is provided by optical source 41, which may be a laser diode with an output wavelength of 915 nm. This pumping energy is coupled into the gain medium via 915/1090 WDM 27. Absorption of the energy at 915 nm results in the development of oscillating pump energy between gratings 42 and 46 at the 1064 nm wavelength. That is, an oscillation path for the 1064 nm pump energy is maintained between the two gratings 42, 46. This further pumps the fiber gain medium, and allows the input optical signal, at the 1090 nm wavelength, to be amplified by stimulated emission as it passes through the amplifier fiber. The amplifier optical signal is thereafter directed to output port 34 via WDM 27.

Figure 5:
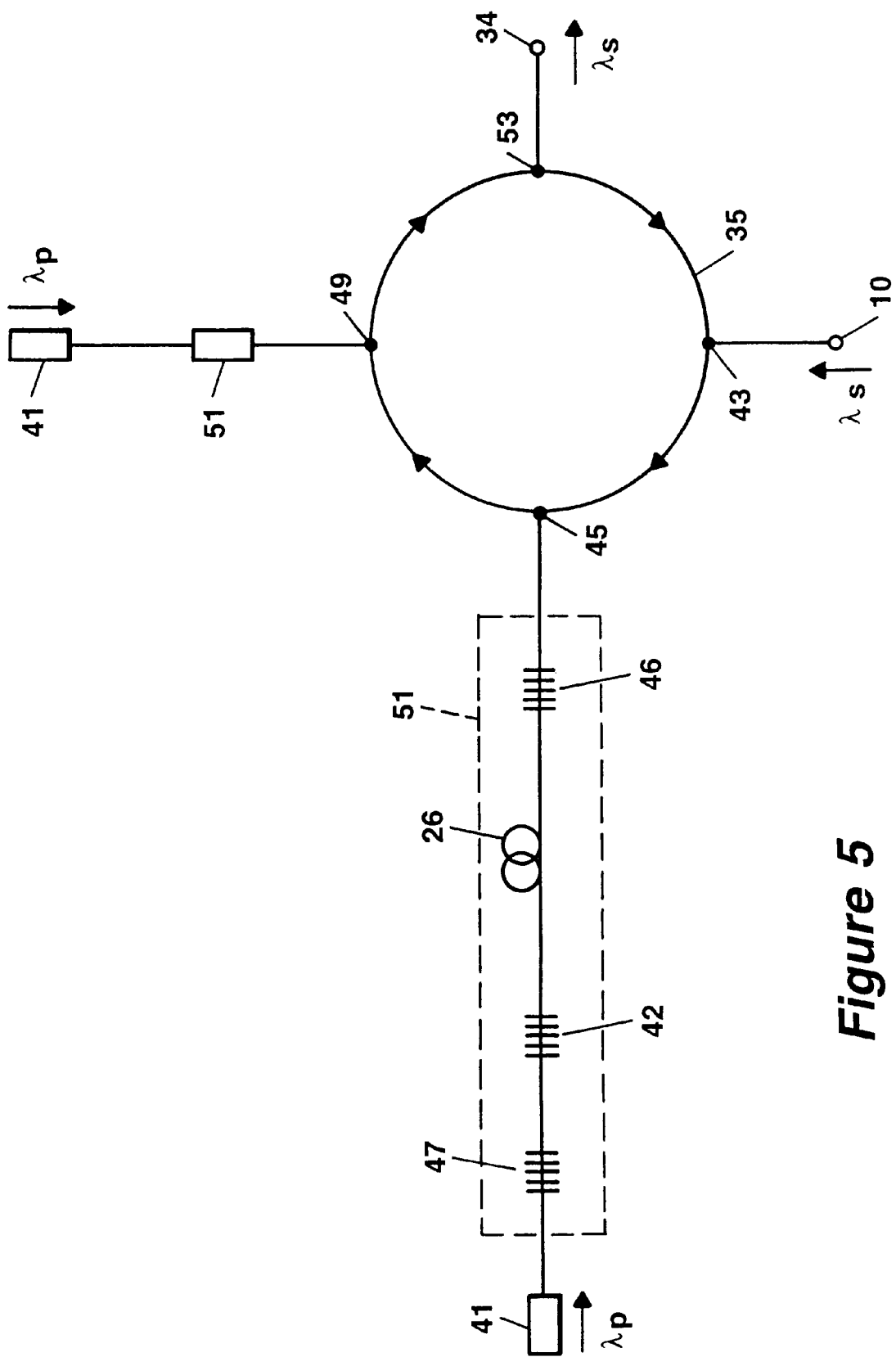
FIG. 5 is an embodiment similar to that of FIG. 5 that uses an optical circulator to direct a signal to be amplified into and out of one or more arms of the circulator, each of which contains an oscillating pump signal in a gain medium.

FIG. 5 depicts a variation of the embodiment shown in FIG. 4. As in FIG. 4, gratings 42, 46 are integrated into a signal pathway to either side of a fiber amplifier 26, doped with, e.g., ytterbium. The gratings 42, 46 are highly reflective at a desired pumping wavelength, such as 1064 nm, and define the desired oscillation path for the pump energy. In the FIG. 5 embodiment, the amplifier and gratings 42, 46 are arranged as a first branch of an optical circulator 35. An optical circulator is a commercially available optical coupler that allows unidirectional one-to-one optical coupling between a set of optical ports. That is, optical energy input to one of the circulator ports is directed to only one other port, and may only be coupled between those two ports in one propagation direction.

Also in the signal path with the fiber amplifier is signal grating 47, which is highly reflective at the wavelength of the desired optical signal (e.g., 1090 nm) and is positioned to the side of the amplifier fiber 26 and gratings 42, 46 away from circulator 35. A pump energy source 41 is coupled into the optical fiber amplifier. This source may be a laser diode having an output wavelength of, e.g., 915 nm. The output wavelength of the pump source 41 is absorbed by the doped fiber 26, and results in the development of an oscillating pump signal between gratings 42 and 46 at the 1064 nm wavelength. The 1064 nm wavelength signal, in turn, further pumps the amplifier fiber, allowing it to provide amplification to a 1090 nm signal passing through it by stimulated emission.

In FIG. 5, the signal to be amplified is directed from input port 10 to a first port 43 of the circulator 35. This results in the signal being output at a second port 45 of the circulator, where it is directed into the pumped amplifier arrangement 51. The optical signal is amplified as it passes through the fiber 26, and is thereafter directed to grating 47. Grating 47, being highly reflected at the signal wavelength, redirects the amplified signal back through amplifier fiber 26, where it is further amplified. When the amplified signal returns to circulator port 45, it is directed to circulator port 49.

FIG. 5 shows a second amplifier stage 51 in the branch connected to circulator port 49. The second amplifier stage 51 may be identical to that located in the branch connected to port 45, and provides additional amplification of the optical signal in the same manner. After the signal passes through the amplification stage 51 of the second branch, it returns to circulator port 49, from which it is directed to port 53, and thereafter to signal output port 34. While two amplifier stages 51 are shown in FIG. 5, those skilled in the art will recognize that the number of stages used is optional. For example, port 49 of the circulator could as easily lead to signal output port 34, if only one stage of amplification was desired. Likewise, a circulator with more than four ports could be used, and additional amplification stages 51 beyond the two shown in FIG. 5 could be used.

In the embodiments of the present invention, pump energy is oscillated through a gain medium of an optical amplifier. The pump energy is thereby directed into both ends of the amplifier without the destabilization risk associated with directing two independent pump energy sources toward each other. Oscillation of the pump energy through the gain medium also provides recycling of the pump energy (as compared with simply passing the pump energy once or twice through the gain medium), and therefore helps to improve the overall power conversion of the amplifier. Finally, the oscillating pump energy may be used to create a high population inversion along the length of the fiber, which helps to keep the noise figure of the amplifier low.

While the invention has been shown and described with reference to a preferred embodiment thereof, it will be understood by those skilled in the art that various changes in form and detail may be made therein without departing from the spirit and scope of the invention as defined by the appended claims. For example, the gain medium described herein is not limited to a doped optical fiber. The present invention may also, for example, be applied to classical bulk optics (i.e. no waveguide), which would make use of traditional optical components, such as mirrors with a predetermined degree of reflectivity. Another alternative might be the application of the invention to Raman amplifiers. Other known amplifier types may make use of the inventive principles disclosed herein as well. Furthermore, the fiber embodiments of the invention may use amplifiers having different doping configurations and desired pump wavelengths.

What is claimed is:

1. An optical amplifier for amplifying an optical signal at a signal wavelength, the amplifier comprising:
    a signal gain medium that comprises a first doped optical fiber and through which the optical signal propagates;
    an optical pumping apparatus generating optical pump energy suitable for pumping the signal gain medium and coupling the pump energy into the signal gain medium, the optical pumping apparatus comprising:
        a pump gain medium that comprises a second doped optical fiber pumped by an optical energy source and that undergoes optical amplification and generates optical pump energy within an absorption band of the signal gain medium in response to the introduction of excitation energy, the pump energy being coupled into a first end of the signal gain medium;
        a first reflector that reflects pump energy into said first end of the signal gain medium, the first reflector being located such that pump energy reflected from the first reflector passes through the pump gain medium prior to entering the signal gain medium; and
        a second reflector that reflects pump energy into a second end of the signal gain medium such that pump energy is reflected back and forth through the signal gain medium between the first reflector and the second reflector, wherein at least one of the first reflector and the second reflector is a bandlimiting reflector that limits the optical pump energy reflected between the first reflector and the second reflector to a wavelength band narrower than said absorption band of the signal gain medium.

2. An optical amplifier according to claim 1 wherein the pump gain medium is a first pump gain medium and wherein the optical pumping apparatus further comprises a second pump gain medium that comprises a third doped optical fiber pumped by an optical energy source, the second pump gain medium being located such that pump energy reflected from the second reflector passes through the second pump gain medium prior to entering the signal gain medium.

3. An optical amplifier according to claim 1 wherein the first reflector comprises a highly reflective Bragg grating.

4. An optical amplifier according to claim 1 wherein the second doped optical fiber comprises a double-clad optical fiber.

5. An optical amplifier according to claim 4 wherein the second reflector comprises a highly reflective Bragg grating.

6. An optical amplifier according to claim 1 wherein the pump gain medium comprises a plurality of doped optical fibers each of which is pumped to generate optical energy at a different wavelength within a first wavelength range capable of pumping said optical gain medium and wherein the optical pumping apparatus further comprises an optical coupling apparatus which couples together the optical energy from said plurality of doped optical fibers.

7. An optical amplifier according to claim 1 wherein the first optical fiber is doped with erbium/ytterbium, and wherein the second optical fiber is doped with ytterbium.

8. An optical amplifier according to claim 1 wherein the pump energy is coupled to the optical fiber with a wavelength division multiplexer.

9. An optical amplifier according to claim 1 wherein the signal gain medium comprises an optical fiber doped with erbium/ytterbium.

10. An optical fiber amplifier for amplifying an optical signal at a signal wavelength, the amplifier comprising:
   an optical fiber doped with a rare earth material through which the optical signal propagates; and
   an optical pumping apparatus comprising:
      a first pump gain medium that, when in an excited state, generates optical energy at a pump wavelength within an absorption band of the doped optical fiber that is coupled into a first end of the optical fiber;
      a second pump gain medium that, when in an excited state, generates optical energy in said absorption band that is coupled into a second end of the optical fiber opposite the first end;
      a first reflector that reflects said optical energy into said first end of the optical fiber, the first reflector being located such that optical energy reflected from the first reflector passes through the first pump gain medium prior to entering the signal gain medium; and
      a second reflector that reflects said optical energy into the second end of the optical fiber, at least one of the first reflector and the second reflector being a bandlimiting reflector that limits the optical pump energy reflected between the first reflector and the second reflector to a bandlimited wavelength band narrower than said absorption band of the doped optical fiber, such that optical energy in the bandlimited wavelength band passing through the optical fiber oscillates between the first reflector and the second reflector.

11. An optical fiber amplifier according to claim 10 wherein the pumping apparatus further comprises:
   a third reflector coupled to the first end of the optical fiber that reflects optical energy at a second wavelength suitable for pumping the doped optical fiber toward the optical fiber; and
   a fourth reflector coupled to the second end of the optical fiber, the second reflector reflecting optical energy at the second wavelength toward the optical fiber such that optical energy at the second wavelength passing through the optical fiber oscillates between the third reflector and the fourth reflector.

12. An optical fiber amplifier for amplifying an optical signal at a signal wavelength, the amplifier comprising:
   an optical fiber doped with a rare earth material through which the optical signal propagates;
   an optical pumping apparatus comprising:
      a first pump gain medium that, when in an excited state, generates optical pump energy at a pump wavelength within an absorption band of the optical fiber that is coupled into a first end of the optical fiber;
      a second pump gain medium that, when in an excited state, generates optical pump energy in said absorption band that is coupled into a second end of the optical fiber opposite the first end;
      a first reflector that reflects said optical pump energy into the first end of the optical fiber, the first reflector being located such that optical pump energy reflected from the first reflector passes through the first pump gain medium prior to entering the optical fiber; and
      a second reflector that reflects said optical pump energy into the second end of the optical fiber opposite the first end, at least one of the first reflector and the second reflector being a bandlimiting reflector that limits the optical pump energy reflected between the first reflector and the second reflector to a bandlimited wavelength band narrower than said absorption band of the doped optical fiber, such that optical energy in the bandlimited wavelength band passing through the optical fiber oscillates between the first reflector and the second reflector;
      a signal reflector coupled to the second end of the optical fiber, the signal reflector reflecting optical signal energy at the signal wavelength back toward the first end of the optical fiber;
   an input port through which the optical signal is input to the first end of the optical fiber; and
   an output port through which the optical signal is output from the first end of the fiber after being amplified.

13. An optical amplifier according to claim 12 wherein the input port and the output port together comprise a port of an optical circulator.

14. A method of amplifying an optical signal at a signal wavelength, the method comprising:
   providing an optical signal gain medium that comprises a first doped optical fiber and through which the optical signal propagates;
   generating optical pump energy within an absorption band of the signal gain medium with a pump gain medium in response to the introduction of excitation energy, and coupling the optical pump energy into a first end of the signal gain medium, the pump gain medium comprising a second doped optical fiber pumped by an optical energy source;
   reflecting pump energy into the first end of the signal gain medium with a first reflector, the first reflector being located such that pump energy reflected from the first reflector passes through the pump gain medium prior to entering the signal gain medium; and
   reflecting pump energy into a second end of the signal gain medium with a second reflector, wherein at least one of the first reflector and the second reflector is a bandlimiting reflector that limits reflected optical pump energy to a bandlimited wavelength band narrower than said absorption band of the signal gain medium.

15. A method according to claim 14 wherein the pump gain medium is a first pump gain medium, and wherein the method further comprises generating optical pump energy with a second pump gain medium that undergoes optical amplification in said absorption band in response to the introduction of excitation energy, and coupling it into the second end of the signal gain medium.

16. A method according to claim 14 further comprising providing a highly reflective Bragg grating as at least part of the bandlimiting reflector.

17. A method according to claim 14 further comprising providing a double-clad optical fiber as at least part of the second doped optical fiber.

18. A method according to claim 16 wherein the bandlimiting reflector is the first reflector and wherein the second reflector comprises a second bandlimiting reflector that limits the optical pump energy it reflects to a said bandlimited wavelength band.

19. A method according to claim 14 wherein generating optical pump energy comprises providing a plurality of doped optical fibers each of which generates optical energy at a different wavelength within a first wavelength range suitable for pumping the optical gain medium, and an optical coupling apparatus that couples together the optical energy from the plurality of doped optical fibers.

20. A method according to claim 14 wherein coupling optical pump energy into a first end of the signal gain medium comprises coupling pump energy into the signal gain medium with a wavelength division multiplexer.

21. A method of amplifying an optical signal at a signal wavelength, the method comprising:
providing an optical fiber doped with a rare earth material through which the optical signal propagates; and
pumping the doped optical fiber with an optical pumping apparatus comprising:
a first pump gain medium that, when in an excited state, generates optical energy within an absorption band of the doped optical fiber that is coupled into a first end of the optical fiber;
a second pump gain medium that, when in an excited state, generates optical energy in said absorption band that is coupled into a second end of the optical fiber opposite the first end;
a first reflector that reflects the optical energy into the first end of the optical fiber, the first reflector being located such that optical energy reflected from the first reflector passes through the first pump gain medium prior to entering the doped optical fiber; and
a second reflector that reflects the optical energy into the second end of the optical fiber, at least one of the first reflector and the second reflector being a bandlimiting reflector that reflects only wavelengths within a bandlimited wavelength band narrower than said absorption band doped optical fiber, such that optical energy in the bandlimited wavelength band passing through the optical fiber oscillates between the first reflector and the second reflector.

22. A method of amplifying an optical signal at a signal wavelength, the method comprising:
providing an optical fiber doped with a rare earth material through which the optical signal propagates;
pumping the optical fiber with an optical pumping apparatus comprising:
a first pump gain medium that, when in an excited state, generates optical pump energy within an absorption band of the doped optical fiber that is coupled into a first end of the optical fiber;
gain medium that, when in an excited state, generates optical pump energy in said absorption band that is coupled into a second end of the optical fiber opposite the first end;
a first reflector that reflects the optical pump energy into the first end of the optical fiber, the first reflector being located such that optical pump energy reflected from the first reflector passes through the first pump gain medium prior to entering the said gain medium; and
a second reflector that reflects the optical pump energy into the second end of the optical fiber, at least one of the first reflector and the second reflector being a bandlimiting reflector that reflects only wavelengths within a bandlimited wavelength band narrower than said absorption band of doped optical fiber, such that optical energy in the bandlimited wavelength band passing through the optical fiber oscillates between the first reflector and the second reflector;
reflecting optical signal energy at the signal wavelength back toward the first end of the optical fiber with a signal reflector coupled to the second end of the optical fiber;
inputting the optical signal to the first end of the optical fiber; and outputting the optical signal from the first end of the fiber.

* * * * *